(No Model.)
W. J. GUBITZ.
CAR SIGNAL.
No. 584,470.  Patented June 15, 1897.
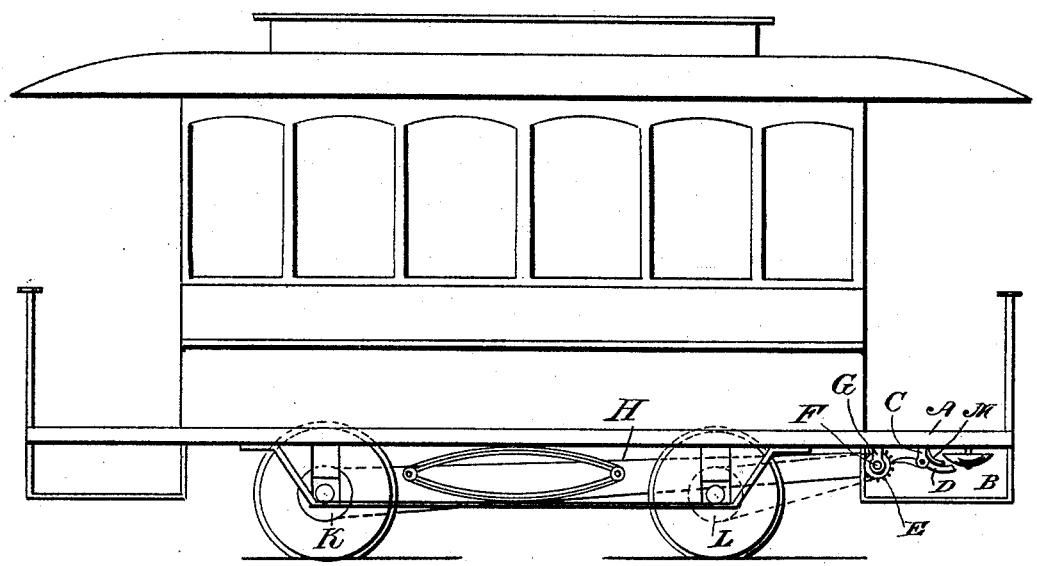
WITNESSES:
INVENTOR
William J. Gubitz,
BY
Edgar Tate & Co
ATTORNEYS.

UNITED STATES PATENT OFFICE.

WILLIAM J. GUBITZ, OF BROOKLYN, NEW YORK.

CAR-SIGNAL.

SPECIFICATION forming part of Letters Patent No. 584,470, dated June 15, 1897.

Application filed August 30, 1895. Serial No. 560,960. (No model.)

*To all whom it may concern:*

Be it known that I, WILLIAM J. GUBITZ, a citizen of the United States, and a resident of Brooklyn, in the county of Kings and State of New York, have invented certain new and useful Improvements in Signal-Gongs for Cars, of which the following is a specification, reference being had to the accompanying drawing, forming a part thereof, in which similar letters of reference indicate corresponding parts.

This invention relates to danger-bells for trolley, cable, and other cars; and the object thereof is to provide a signal-bell of this class comprising a gong or bell which is automatically operated at all times; and with this and other objects in view the invention consists in the construction, combination, and arrangement of parts hereinafter described.

The invention is fully disclosed in the following specification, of which the accompanying drawing forms a part, which represents in side elevation a car provided with my improvement.

In the practice of my invention I secure beneath the platform A of a car, and preferably near the outer end thereof, a bell or gong B, the convex or rounded surface of which is preferably directed downward, and rearwardly thereof is provided a hanger C, with which is pivotally connected a lever D, one end of which is adapted to operate in connection with the gong or bell and serve as a hammer therefor, and the other end of which extends backwardly and is adapted to be operated by a sprocket or toothed wheel E, secured to a shaft F, mounted in hangers G, and which is arranged transversely of the platform.

The wheel E or the shaft F is operated by a belt, chain, or similar device H, which extends backwardly to the rear axle of the car and over a wheel K, mounted thereon, or said wheel may be mounted on the front axle, if desired, as shown in dotted lines at L.

A spring, as M, is secured to the platform of the car or to the hanger C and operates normally to press the hammer end of the lever D downward or out of contact with the gong or bell.

The operation will be readily understood from the foregoing description when taken in connection with the accompanying drawing. When the car is in motion, the wheel E is continuously revolved by the belt H, and as the teeth thereon strike the adjacent end of the lever D said lever is operated to strike and sound the bell, being constantly thrown into operative position by the spring M, and, as will be seen, this operation of the lever will be continuous and uninterrupted as long as the car is in motion.

I may of course provide means for throwing the gong out of contact or operative connection with the lever, so as to stop the operation thereof if at times this should be necessary; but such an arrangement will readily suggest itself and forms no part of this invention, and it will also be understood that one of my automatic signals or gongs may be applied to each end of the car.

My invention is not limited to the exact form, construction, and arrangement of parts shown and described, and I therefore reserve the right to make all such alterations therein and modifications thereof as fairly come within the scope of the invention.

Having fully described my invention, I claim and desire to secure by Letters Patent—

A danger-bell for trolley or other cars in combination with a platform and near the outer end thereof a bell, the convex or rounded surface thereof being downwardly directed, a hanger secured to the under portion of said platform behind said gong, a lever pivotally connected therewith, one end of said lever being adapted to operate in connection with said bell, the further end extending backwardly, a sprocket or toothed wheel engaging the same, a shaft having the said wheel mounted thereon, hangers supporting said shaft and arranged transversely of said platform, a belt or chain engaging said shaft and passing backwardly over the rear axle of said car, a wheel on said rear axle engaging said belt, a spring secured to the platform of the said car and adapted to press the hammer end of said lever downwardly, all of the said parts being combined substantially as and for the purposes set forth and described.

In testimony that I claim the foregoing as my invention I have signed my name, in presence of the subscribing witnesses, this 29th day of August, 1895.

WILLIAM J. GUBITZ.

Witnesses:
 C. GERST,
 S. L. HAWKSHURST.